United States Patent
Pan et al.

(10) Patent No.: US 9,246,382 B2
(45) Date of Patent: Jan. 26, 2016

(54) CHARGE PUMP INCLUDING SUPPLY VOLTAGE-BASED CONTROL SIGNAL LEVEL

(71) Applicant: Micron Technology, Inc., Boise, ID (US)

(72) Inventors: Dong Pan, Boise, ID (US); John F. Schreck, Lucas, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 13/962,596

(22) Filed: Aug. 8, 2013

(65) Prior Publication Data

US 2015/0042398 A1 Feb. 12, 2015

(51) Int. Cl.
*H02M 3/07* (2006.01)

(52) U.S. Cl.
CPC ....................... *H02M 3/07* (2013.01)

(58) Field of Classification Search
USPC ........................................................ 327/536
See application file for complete search history.

(56) References Cited

U.S. PATENT DOCUMENTS

| | | | |
|---|---|---|---|
| 4,271,461 A * | 6/1981 | Hoffmann et al. ............... | 363/60 |
| 5,338,988 A * | 8/1994 | Yamamura et al. ............ | 327/306 |
| 5,394,027 A * | 2/1995 | Park .............................. | 327/536 |
| 5,436,587 A * | 7/1995 | Cernea .......................... | 327/536 |
| 6,055,168 A * | 4/2000 | Kotowski et al. ............... | 363/60 |
| 6,198,340 B1 * | 3/2001 | Ting et al. ..................... | 327/536 |
| 6,278,294 B1 * | 8/2001 | Taniguchi ....................... | 326/80 |
| 6,563,235 B1 * | 5/2003 | McIntyre et al. .............. | 307/109 |
| 6,762,640 B2 * | 7/2004 | Katsuhisa ....................... | 327/536 |
| RE38,777 E * | 8/2005 | Adams et al. ...................... | 607/5 |
| 7,233,508 B2 * | 6/2007 | Itoh ................................... | 363/60 |
| 7,236,046 B2 * | 6/2007 | Georgescu et al. ............. | 327/536 |
| 7,518,432 B2 * | 4/2009 | Lin et al. ........................ | 327/536 |
| 7,602,232 B2 * | 10/2009 | Georgescu et al. ............. | 327/536 |
| 7,602,233 B2 * | 10/2009 | Pietri et al. ..................... | 327/536 |
| 8,390,365 B2 * | 3/2013 | Chang et al. ................... | 327/536 |
| 8,519,780 B1 * | 8/2013 | Vilas Boas et al. ............. | 327/536 |
| 8,797,770 B2 * | 8/2014 | Conta et al. ..................... | 363/59 |
| 2005/0127982 A1 * | 6/2005 | Khouri et al. ................. | 327/536 |
| 2007/0127277 A1 * | 6/2007 | Fujiwara .......................... | 363/59 |
| 2007/0139982 A1 * | 6/2007 | Ueno et al. ...................... | 363/59 |
| 2008/0012627 A1 * | 1/2008 | Kato ............................... | 327/536 |
| 2008/0143424 A1 * | 6/2008 | Tain ............................... | 327/536 |
| 2009/0066408 A1 * | 3/2009 | Fujiwara ......................... | 327/536 |
| 2009/0230926 A1 * | 9/2009 | Yang et al. ..................... | 320/167 |
| 2009/0309566 A1 * | 12/2009 | Shiu ................................ | 323/283 |
| 2011/0101938 A1 * | 5/2011 | Ma et al. ........................ | 323/282 |
| 2012/0133425 A1 * | 5/2012 | Maejima ......................... | 327/536 |
| 2012/0139622 A1 * | 6/2012 | Ryu ................................. | 327/536 |
| 2014/0375378 A1 * | 12/2014 | Youssefi ......................... | 327/536 |

* cited by examiner

*Primary Examiner* — Thomas J Hiltunen

(74) *Attorney, Agent, or Firm* — Schwegman Lundberg & Woessner, P.A.

(57) ABSTRACT

Some embodiments include apparatuses and methods having an input node to receive a first voltage, an output node to provide an output voltage, and a charge pump to generate the output voltage based on the first voltage. The charge pump can include a control node to receive a control signal for controlling at least one switch of the charge pump, such that the output voltage includes a value greater than a value of the first voltage. The control signal can include a level corresponding to a second voltage having a value greater than the value of the output voltage. Additional apparatus and methods are described.

13 Claims, 5 Drawing Sheets

CHARGE PUMP INCLUDING SUPPLY VOLTAGE-BASED CONTROL SIGNAL LEVEL

BACKGROUND

Some devices, such as memory devices, memory controllers, and processors, may use a supply voltage to generate an additional voltage for use in some operations in the device. The additional voltage may be lower or higher than the supply voltage. Some devices may employ a technique that uses a regulator in the device to generate a lower voltage from a higher supply voltage. Other devices may employ another technique that uses a charge pump in the device to generate a higher voltage from a lower supply voltage. However, in some devices one or both of these techniques may be inefficient or inapplicable.

DETAILED DESCRIPTION

Figure 1:
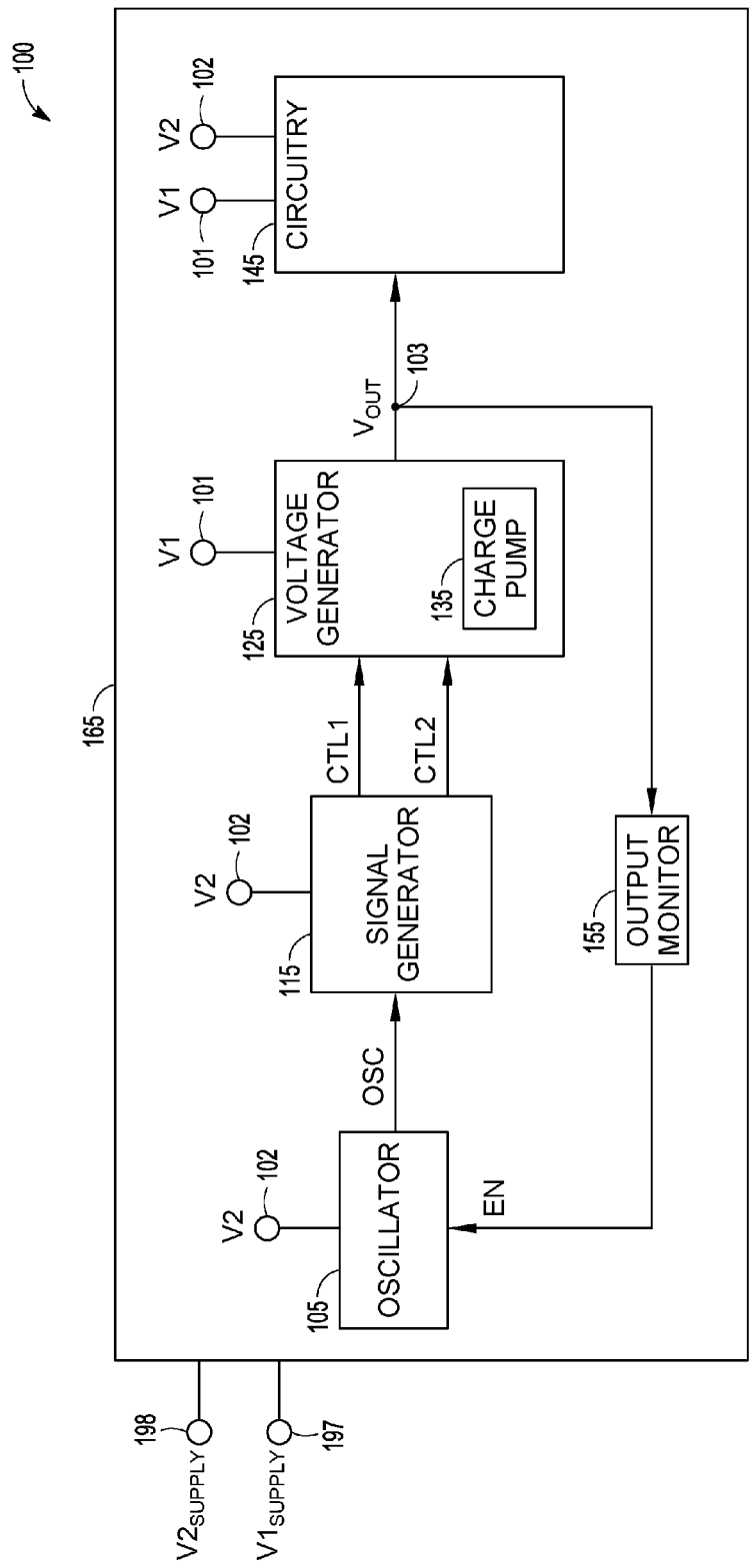
FIG. 1 shows a block diagram of a device including a charge pump, according to an embodiment of the invention.

FIG. 1 shows a block diagram of an apparatus, in the form of a device 100, according to an embodiment of the invention. Device 100 can include a memory device, a memory controller, a processor, a combination of these devices, or other devices. An example of a memory device includes a dynamic random access memory (DRAM) device, a static random access memory (SRAM) device, a flash memory device, a phase change memory device, or another type of memory device.

As shown in FIG. 1, memory device 100 can include an oscillator 105, a signal generator 115, a voltage generator 125, circuitry 145, and an output monitor 155. These components can be located in (e.g., formed in or formed on) a same die, such as die 165, of device 100. Die 165 can include a semiconductor die (e.g., a silicon die). Device 100 may include other components (e.g., components of a memory device), which are omitted from FIG. 1 to help focus on the embodiments described herein.

Device 100 can include a supply node 197 to receive a supply voltage $V1_{SUPPLY}$ (e.g., Vcc) and a supply node 198 to receive a supply voltage $V2_{SUPPLY}$ (e.g., Vpp). Supply voltages $V1_{SUPPLY}$ and $V2_{SUPPLY}$ can be provided to device 100 by, for example, a capacitor, battery or an AC (alternating current) to DC (direct current) converter. The value of voltage $V2_{SUPPLY}$ can be greater than the value of voltage $V1_{SUPPLY}$. For example, supply voltage $V2_{SUPPLY}$ can have a value of approximately 1.8 volts (V) or approximately 2.5V, and supply voltage $V1_{SUPPLY}$ can have a value of approximately 1.2V.

Device 100 can also include a node (e.g., input node) 101 and a node 102 to receive voltages V1 and V2, respectively. Voltage V1 can include supply voltage $V1_{SUPPLY}$, such that the value of voltage V1 can be equal to the value of supply voltage $V1_{SUPPLY}$. Voltage V2 can include supply voltage $V2_{SUPPLY}$, such that the value of voltage V2 can be equal to the value of supply voltage $V2_{SUPPLY}$. Voltages V1 and V2 are DC voltages.

Oscillator 105 can generate a signal (e.g., an oscillating signal) OSC based on voltage V2. Signal OSC can change (e.g., oscillate) between a level corresponding to voltage V2 and another level corresponding to another voltage (e.g., zero volts).

Signal generator 115 can receive signal OSC and generate control signals (e.g., clock signals) CTL1 and CTL2 based on voltage V2. The frequency of signals CTL1 and CTL2 can be based on (e.g., equal to) the frequency of signal OSC. Signals CTL1 and CTL2 can be non-overlapping signals. Each of control signals CTL1 and CTL2 can change between a level corresponding to voltage V2 and another level corresponding to another voltage (e.g., zero volts).

Voltage generator 125 can receive voltage V1 and generate an output voltage $V_{OUT}$. Voltage generator 125 can include a charge pump 135 that can receive voltage V1 as an input voltage to generate an output voltage $V_{OUT}$. The value of output voltage $V_{OUT}$ can be greater than the value of voltage V1 and less than the value of voltage V2 (e.g., $V1 < V_{OUT} < V2$). As an example, the values of voltages V1, $V_{OUT}$, V2 can be approximately 1.2V, 1.4V, and 2.5V, respectively. Since the values of voltages V1 and V2 can be equal to the value of supply voltages $V1_{SUPPLY}$ and $V2_{SUPPLY}$, respectively, the value of output voltage $V_{OUT}$ can also be greater than the value of supply voltage $V1_{SUPPLY}$ and less than the value of supply voltage $V2_{SUPPLY}$ (e.g., $V1_{SUPPLY} < V_{OUT} < V2_{SUPPLY}$).

Charge pump 135 can include capacitors and switches (e.g., not shown in FIG. 1). The capacitors can operate to accumulate and store charge using energy from voltage V1. The switches can include transistors that can be controlled (e.g., turned on or turned off) by signals CTL1 and CTL2 at selected time intervals to control the amount of charge that can be provided from the capacitors to node 103 as output voltage $V_{OUT}$. The value of output voltage $V_{OUT}$ can be maintained (e.g., unchanged) at approximately a selected (predetermined) value during operation of voltage generator 125.

Circuitry 145 can include some components of a memory device such as memory cells, sense amplifiers, error correction code (ECC) generator, and buffers (e.g., input buffers). One or more of these components may operate using output voltage $V_{OUT}$ in addition to (or in place of) voltage V1, voltage V2, or both.

Output monitor 155 can monitor the value of output voltage $V_{OUT}$ to control (e.g., activate or deactivate) a signal EN (e.g., enable signal) in order to affect the operations of oscillator 105 and signal generator 115, such that value of output voltage $V_{OUT}$ can be maintained. For example, during generation of output voltage $V_{OUT}$, output monitor 155 can cause signal EN to be at one level if the value of output voltage $V_{OUT}$ exceeds an upper limit (e.g., a predetermined upper limit) and can also cause signal EN to be at another level if the value of output voltage $V_{OUT}$ falls below a lower limit (e.g., a predetermined lower limit). Based on the level of signal EN, oscillator 105 can operate to control signal OSC (e.g., deactivate, activate, or change the duty cycle of signal OSC). In turn, signal generator 115 can operate to control signals CTL1 and CTL2 (e.g., deactivate, activate, or change the duty cycle of signals CTL1 and CTL2) in order to maintain the value of output voltage $V_{OUT}$ to be within the lower and upper limits.

As described above, charge pump 135 can generate an output voltage $V_{OUT}$ based on voltage V1. Charge pump 135 may, alternatively, generate output voltage $V_{OUT}$ based on voltage V2 (instead of voltage V1). However, in some configuration of device 100, supply current (e.g., $I_{V2}$) capability of voltage V2 may be limited (e.g., less than 10 mA). Thus, if voltage V2 is used to generate voltage $V_{OUT}$ in such a configuration, output current (e.g., $I_{VOUT}$) may be insufficient to drive other circuitry (e.g., circuitry 145) of device 100. As described in more detail with reference to FIG. 3, charge pump 135 (e.g., using a structure shown in FIG. 3 or FIG. 4) may achieve a relatively high output current efficiency (and high power efficiency) sufficiently to drive other circuitry of device 100.

As described above, signal generator 115 can generate control signals CTL1 and CTL2 based on voltage V2, such that each of control signals CTL1 and CTL2 can include a level corresponding to voltage V2. Since voltage V2 can be used to generate control signals CTL1 and CTL2, signal generator 115 may generate control signals CTL1 and CTL2 without using an additional charge pump (besides charge pump 135 of voltage generator 125). However, in an alternative structure, signal generator 115 may include an additional charge pump and a level shifting circuit to generate control signals CTL1 and CTL2 based on voltage V1 (instead of voltage V2), such that each of control signals CTL1 and CTL2 can include a level corresponding to a voltage having a value greater than the value of $V_{OUT}$. In comparison with the structure of signal generator 115 in FIG. 3 (without the additional charge pump), the alternative structure (with the additional charge pump) may consume more power, may have reduced pump efficiency, or both.

Figure 2:
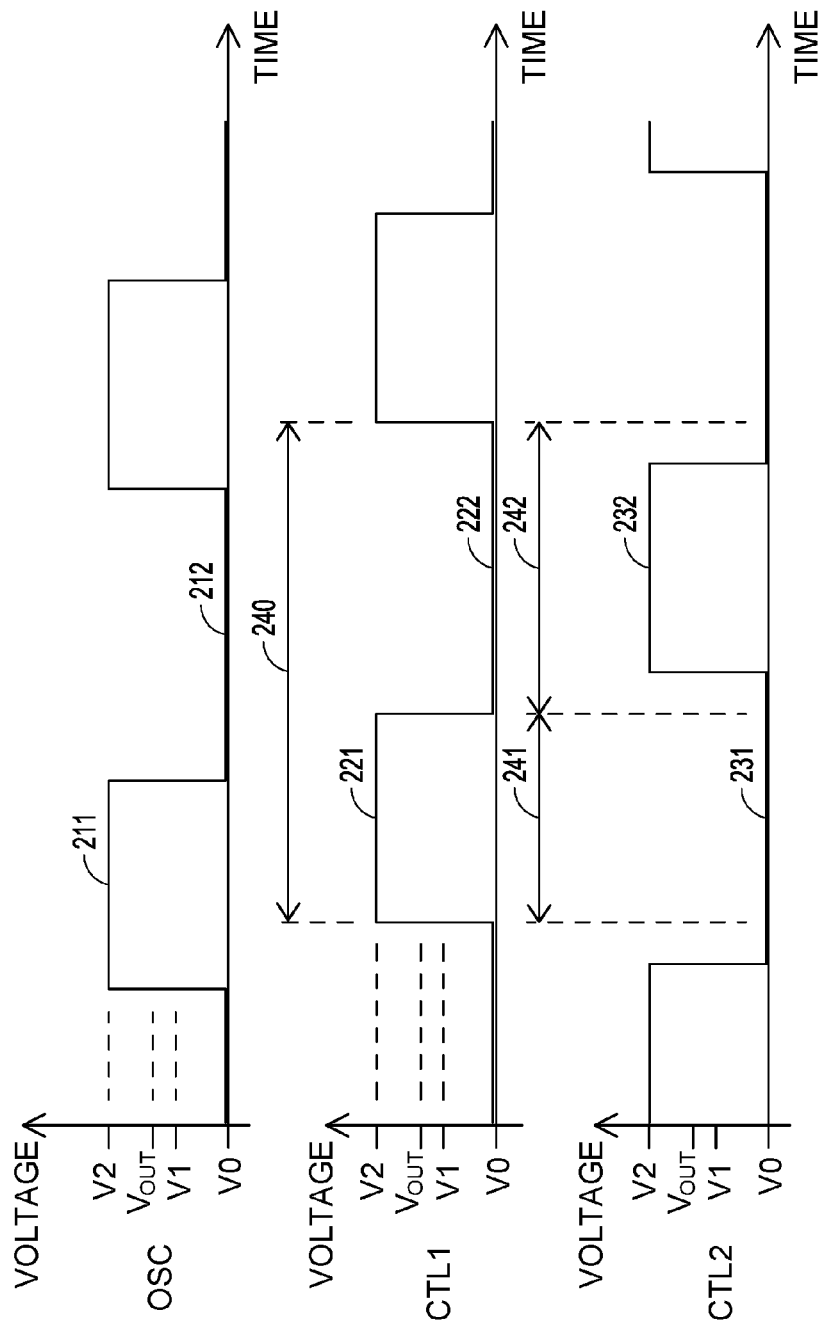
FIG. 2 shows an example timing diagram including waveforms of control signals during generation of an output voltage, according to an embodiment of the invention.

FIG. 2 shows an example timing diagram including waveforms of signal OSC and control signals CTL1 and CTL2 of FIG. 1 during generation of output voltage $V_{OUT}$, according to an embodiment of the invention. Signal OSC can include a level 211 corresponding to voltage V2 and a level 212 corresponding to voltage V0 (e.g., zero volts). Control signal CTL1 can include a level 221 corresponding to voltage V2 and a level 222 corresponding to voltage V0. Control signal CTL2 can include a level 231 corresponding to voltage V2 and a level 232 corresponding to voltage V0.

As shown in FIG. 2 (and as described above with reference to FIG. 1), the value of voltage V2 can be greater than the value of each of output voltage $V_{OUT}$ and voltage V1 (e.g., V1<$V_{OUT}$<V2). Thus, each of levels 211, 221, and 232 of signal OSC and control signals CTL1 and CTL2, respectively, can have a value equal to the value of voltage V2 and greater than the value of each of output voltage $V_{OUT}$ and voltage V1.

Control signal CTL1 can include a period 240 having time intervals 241 and 242. The portion of control signal CTL1 having level 221 can occur during time interval 241. The portion of control signal CTL1 having level 222 can occur during time interval 242. The portion of control signal CTL2 having level 231 can occur during time interval 241. The portion of control signal CTL3 having level 232 can occur during time interval 242.

As shown in FIG. 2, control signals CTL1 and CTL2 can be non-overlapping signals. For example, level 221 of control signal CTL1 and level 232 of control signal CTL2 are not overlapped with respect to time.

Figure 3:
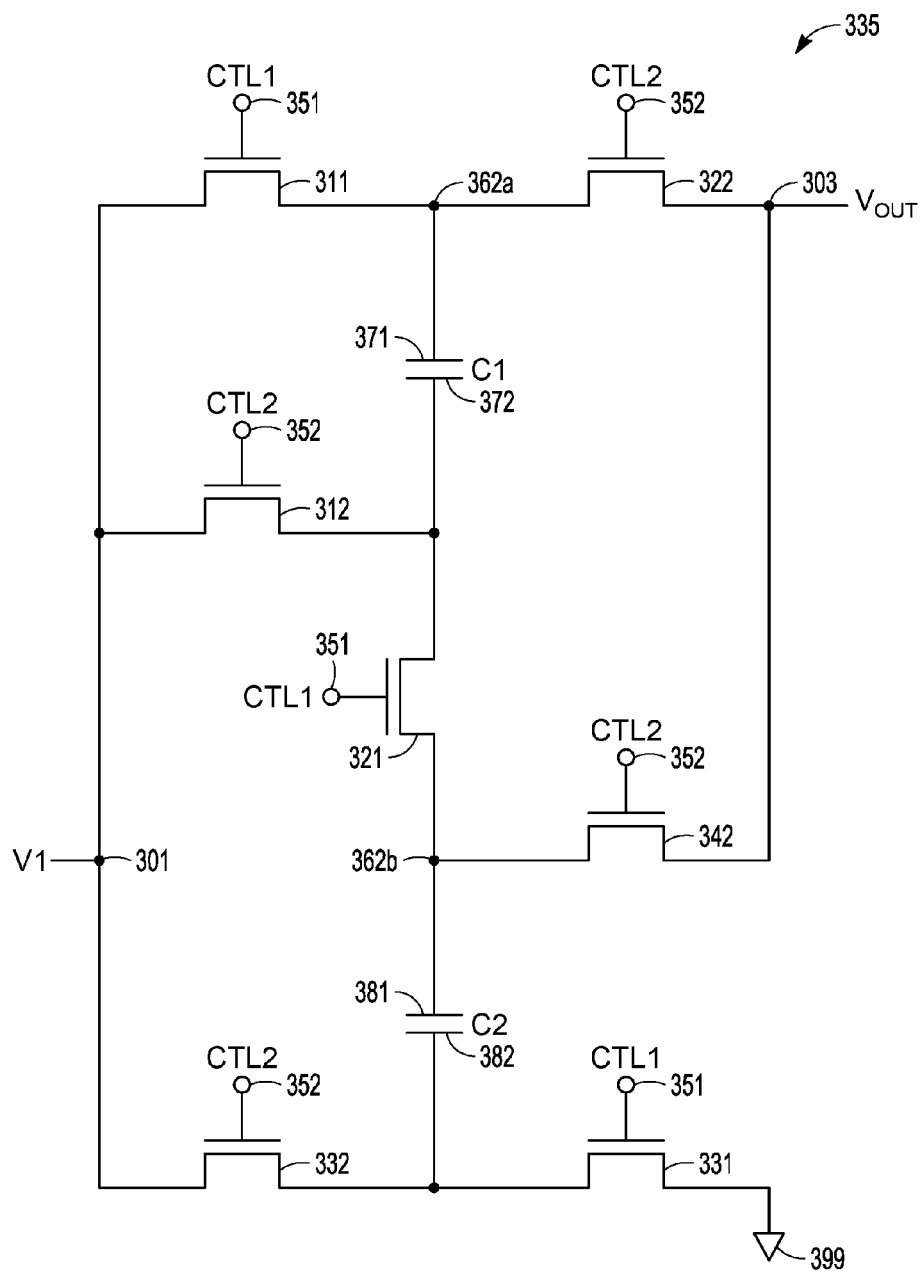
FIG. 3 shows a schematic diagram of a charge pump, according to an embodiment of the invention.

FIG. 3 shows a schematic diagram of a charge pump 335, according to an embodiment of the invention. Charge pump 335, which can be used as charge pump 135 of FIG. 1, can generate output voltage $V_{OUT}$ based on voltage V1. Charge pump 335 can include a node (e.g., input node) 301 to receive voltage V1, a node (e.g., output node) 303 to provide output voltage $V_{OUT}$, a node (e.g., a reference node) 399 to provide a path to ground, and nodes 351 and 352 to receive signals CTL1 and CTL2, respectively. Voltage V1, output voltage $V_{OUT}$, and control signals CTL1 and CTL2 can correspond to those described above with reference to FIG. 1 and FIG. 2.

As shown in FIG. 3, charge pump 335 can include a capacitor C1 having sides (e.g., capacitor plates) 371 and 372, and a capacitor C2 having sides (e.g., capacitor plates) 381 and 382. Charge pump 335 can include transistors 311, 321, 331, 312, 322, 332, and 342. These transistors can be controlled by control signals CTL1 and CTL2 that are applied to their gates to cause these transistors to operate as switches (e.g., can turn on or turn off). Each of transistors 311, 321, 331, 312, 322, 332, and 342 can include an n-channel transistor (e.g., n-channel metal-oxide semiconductor (NMOS) transistor). The following description refers to FIG. 2 and FIG. 3.

In operation, different groups of transistors among transistors 311, 321, 331, 312, 322, 332, and 342 can be turned on (or turned off) during different time intervals of the generation of output voltage $V_{OUT}$ to couple capacitor C1 and capacitor C2 to node 301 (which receives voltage V1) and node 303 (which provides output voltage $V_{OUT}$). Charge pump 335 can use control signals CTL1 and CTL2 having waveforms shown in FIG. 2 to control transistors 311, 321, 331, 312, 322, 332, and 342 such that the value of output voltage $V_{OUT}$ at node 303 can be greater than value of voltage V1 at node 301.

During time interval 241 (FIG. 2), transistors 311, 321, and 331 can be turned on to couple capacitor C1 in series with capacitor C2 between node 301 and node 399. For example, transistor 321 can be turned on to couple capacitor C1 to capacitor C2. Transistor 311 can be turned on to couple side 371 of capacitor C1 to node 301. Transistor 331 can be turned on to couple capacitor C2 to node 399.

During time interval 241, transistors 312 and 322 can be turned off, such that sides 372 and 382 of capacitors C1 and C2, respectively, are not coupled to node 301. Transistors 322 and 342 can be turned off to decouple capacitors C1 and C2 from node 303.

During time interval 241, the value (e.g., maximum value) of the voltage at node 362a (e.g., $V_{362a}$) can be approximately one-half (½) the value of voltage V1 (e.g., $V_{362a}$=0.5V1). The value (e.g., maximum value) of the voltage at node 362b (e.g., $V_{362b}$) can also be approximate one-half the value of voltage V1 (e.g., $V_{362b}$=0.5 V1).

During time interval 242 (FIG. 2), transistors 311, 321, and 331 can be turned off to decouple capacitor C1 from capacitor C2 and decouple the series combination of capacitor C1 and capacitor C2 from nodes 301 and 399. For example, transistor 321 can be turned off to decouple capacitor C1 from capacitor C2. Transistor 311 can be turned off to decouple side 371 of capacitor C1 from node 301. Transistor 331 can be turned off to decouple capacitor C2 from node 399.

During time interval 242, transistors 312, 322, 332, and 342 can be turned on to couple capacitor C1 and capacitor C2 to nodes 301 and 303 through different circuit paths. Capacitor C1 can be coupled to (e.g., coupled between) nodes 301 and 303 through a circuit path that includes transistors 312 and 322. For example, during time interval 242, transistor 312 can be turned on to couple side 372 of capacitor C1 to node 301. Transistor 322 can be turned on to couple side 371 of capacitor C1 to node 303. Capacitor C2 can be coupled to (e.g., coupled between) nodes 301 and 303 through another circuit path that includes transistors 332 and 342. For example, during time interval 242, transistor 332 can be turned on to couple side 382 of capacitor C2 to node 301. Transistor 342 can be turned on couple side 381 of capacitor C2 to node 303.

During time interval 242, the value of the voltage at node 362a can be approximately equal to the accumulated value (e.g., the sum) of the voltage at node 362a from both time intervals 241 and 242 (e.g., as a result of the charging action of capacitor C1 during both time intervals 241 and 242). For example, the value (e.g., maximum value) of the voltage at node 362a during time interval 242 can be approximately equal to one and a half (1½) the value of voltage V1 (e.g., $V_{362a}$=0.5V1 (during time interval 241)+V1 (during time interval 242)). Thus, the value (e.g., maximum value) of the voltage at node 362a ($V_{362a}$) can be a non-integer multiple (e.g., 1.5 times) of the value of V1.

During time interval 242, the value of the voltage at node 362b can be approximately equal to the accumulated value (e.g., the sum) of the voltage at node 362b during both time intervals 241 and 242 (e.g., as a result of the charging action of capacitor C2 during both time intervals 241 and 242). For example, the value of the voltage at node 362b during time interval 242 can be approximately equal to one and a half (1½) the value of voltage V1 (e.g., $V_{362b}$=0.5V1 (during time interval 241)+V1 (during time interval 242)). Thus, the value (e.g., maximum value) of the voltage at node 362b ($V_{362b}$) can be a non-integer multiple (e.g., 1.5 times) of the value of V1.

As described above, node 362a (at side 371 of capacitor C1) and node 362b (at side 381 of capacitor C2) can be coupled to node 303 (e.g., during time interval 242). Since the value (e.g., maximum value) of the voltage (e.g., $V_{362a}$ or $V_{362b}$) at each of nodes 362a and 362b can be a non-integer multiple (e.g., 1.5 times) of the value of V1, the value (e.g., maximum value) of output voltage $V_{OUT}$ can also be a non-integer multiple (e.g., 1.5 times) of the value of V1.

The value of output voltage $V_{OUT}$ can be selected (e.g., predetermined) to be less than the maximum value (e.g., less than the value of 1.5V1) and greater than the value of voltage V1. For example, the value of output voltage $V_{OUT}$ can be selected to be at a voltage from approximately 1.3 volts to approximately 1.5 volts (e.g., at approximately 1.3V, 1.4V, 1.5V, or at another value between 1.3V and 1.5V) if the value of voltage V1 is approximately 1.2V. Thus, in this example, the value of output voltage $V_{OUT}$ can be maintained at the selected value, such as at a value from approximately 1.3V, 1.4V, 1.5V, or at another value between 1.3V and 1.5V. As described above with reference to FIG. 1, an output monitor, such as output monitor 155, can be used to maintain the value of output voltage $V_{OUT}$.

By generating output voltage $V_{OUT}$ based on voltage V2 and using control signals CTL1 and CTL2 as described above, charge pump 335 may achieve a relatively high output current efficiency. For example, charge pump 335 may achieve approximately 66% maximum output current efficiency (e.g., $I_{VOUT}/I_{V1}$=0.66) and approximately 64% maximum overall output current efficiency (e.g., $I_{VOUT}/(I_{V1}+I_{V2})$=0.64). The overall power efficiency of charge pump 335 may be approximately 75% (e.g., $(I_{VOUT}*V_{OUT})/((I_{V1}*V1)+(I_{V2}*V2))$=0.75).

In an alternative structure of charge pump 335, the combination of transistors 312 and 322 or the combination of transistors 332 and 342 can be omitted. In such an alternative structure, only one of capacitors C1 and capacitor C2 (either C1 or C2) can be coupled to node 303 during time interval 242. For example, if transistors 332 and 342 are omitted, only capacitor C1 can be coupled to node 303 (e.g., through transistor 322) during time interval 242. In another example, if transistors 312 and 322 are omitted, only capacitor C2 can be coupled to node 303 (e.g., through transistor 342). Omitting transistors from such an alternative structure of charge pump 335 may save space. However, in comparison with charge pump 335 shown in FIG. 3, the alternative charge pump may take more time for output voltage $V_{OUT}$ to reach its selected (e.g., predetermined) value, may have reduced drive capability, or both.

Figure 4:
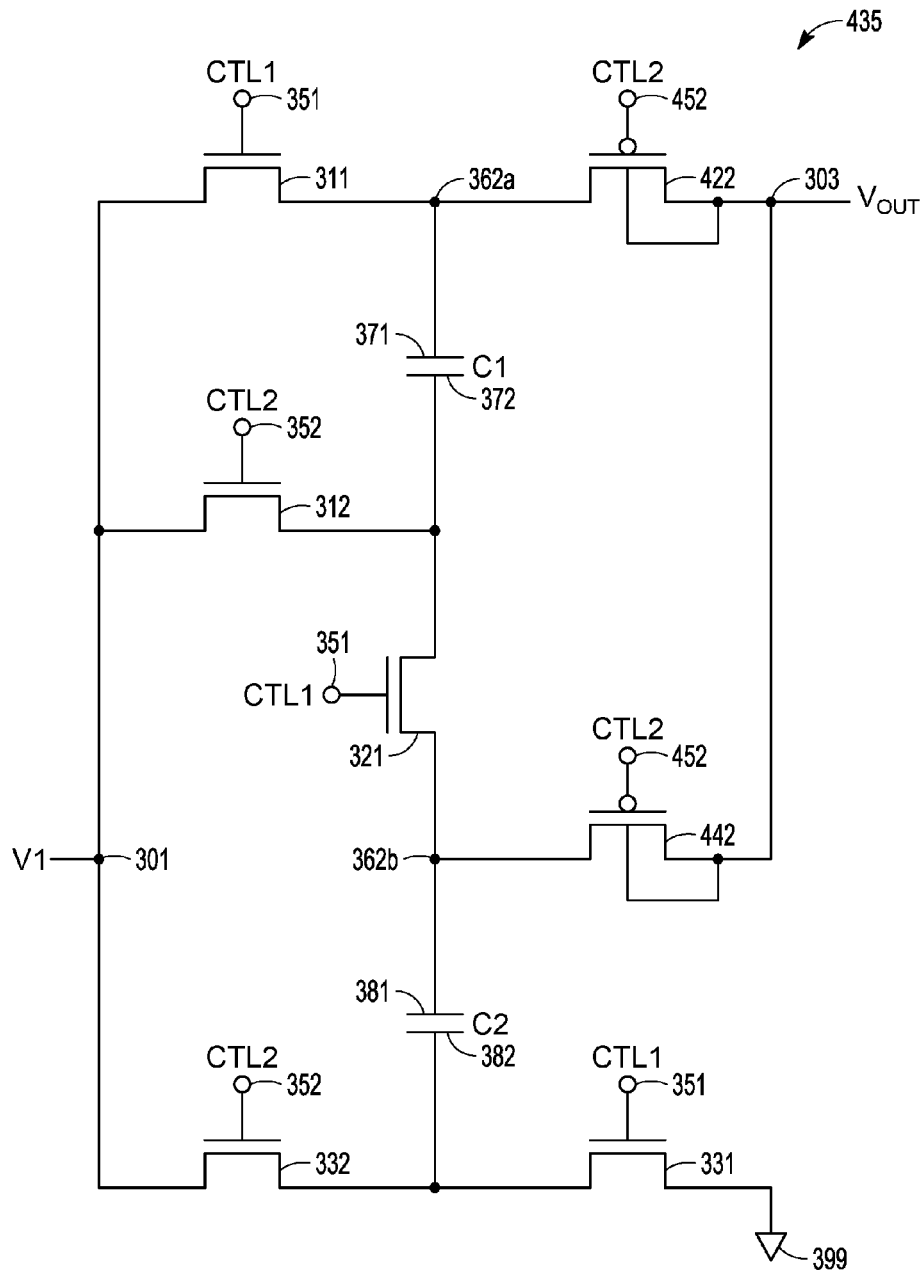
FIG. 4 shows a schematic diagram of another charge pump, which can be a variation of the charge pump of FIG. 3, according to an embodiment of the invention.

FIG. 4 shows a schematic diagram of a charge pump 435 including p-channel transistors, according to an embodiment of the invention. Charge pump 435 can be a variation of charge pump 335 of FIG. 3. The operation of charge pump 435 can be similar to, or identical to, the operation of charge pump 335 of FIG. 3. For simplicity, similar or identical elements between charge pumps 335 and 435 are given the same designations. The descriptions and operations of such elements are not repeated in the description of FIG. 4.

Differences between charge pumps 335 and 435 include the different types of transistors 322 and 342 (FIG. 3) and transistors 422 and 442 (FIG. 4). As described above with reference to FIG. 3, transistors 322 and 342 can include n-channel transistors. In FIG. 4, each of transistors 422 and 442 can include a p-channel transistor (e.g., p-channel metal-oxide semiconductor (PMOS) transistor). In FIG. 3, transistors 322 and 342 can be structured to have a relatively low threshold voltage Vt (e.g., Vt=0.3V). In some structures, transistors (e.g., transistors 322 and 342) having relatively low Vt may be unavailable. Thus, in such structures, transistors (e.g., transistors 422 and 442) having a relative higher Vt (e.g., Vt=0.8V) may be used. The structure of charge pump 435 may have a relatively reduced forward biasing and latch up risk (e.g., because the structure may not have a weak driving bulk).

In FIG. 4, transistors 422 and 442 can be controlled by control signal CTL2* at a node 452. Control signal CTL2* can be an inverted form of control signal CTL2 of FIG. 2 and FIG. 3. A signal generator of a device (e.g., device 100 of FIG. 1) that includes charge pump 435 can generate control signal CTL2* (e.g., by passing control signal CTL2 through an inverting circuit).

Figure 5:
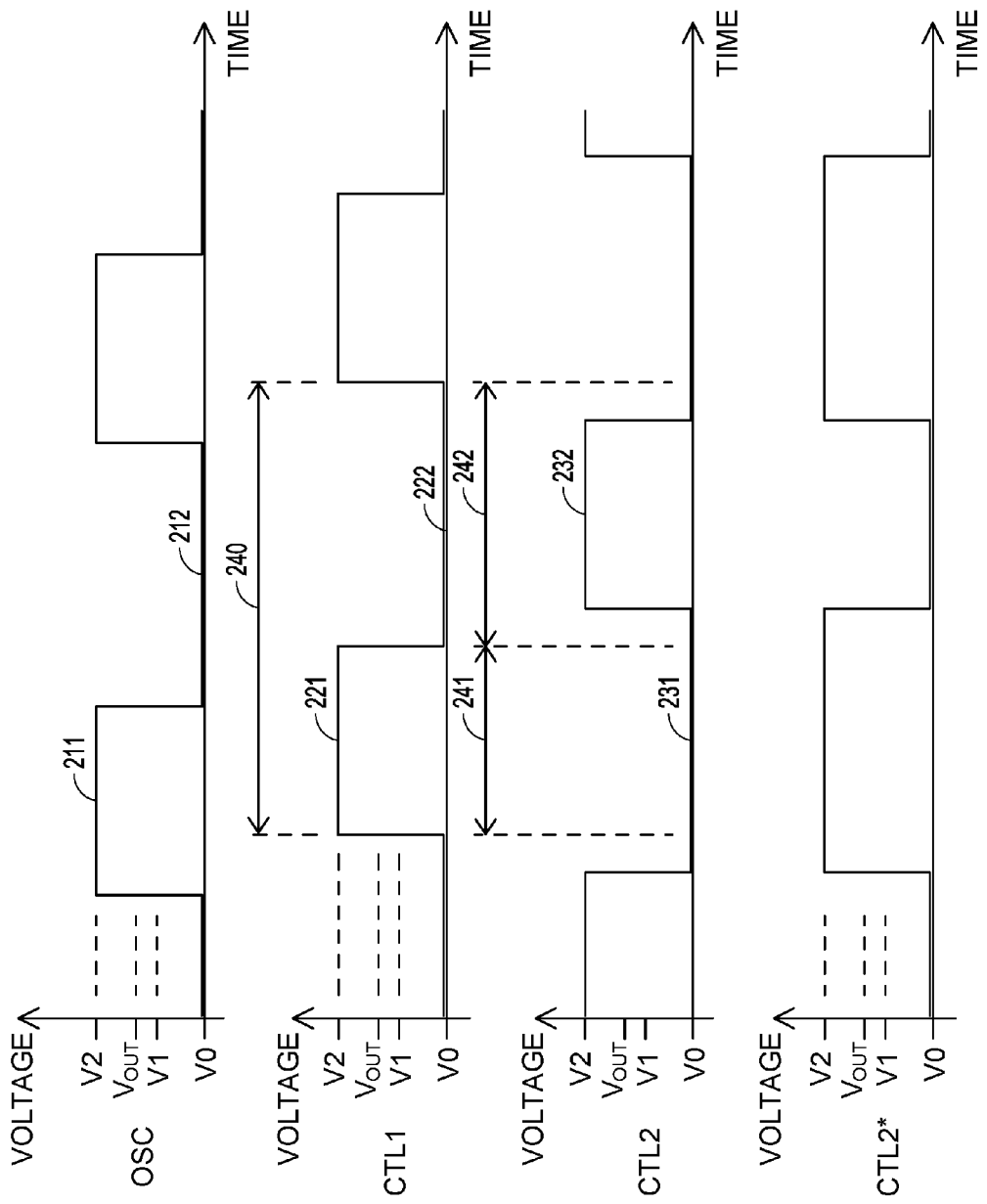
FIG. 5 shows an example timing diagram including waveforms of control signals for the charge pump of FIG. 4, according to an embodiment of the invention.

FIG. 5 shows an example timing diagram including waveforms of signal OSC and control signals CTL1, CTL2, and CTL2* of FIG. 4 during generation of output voltage $V_{OUT}$, according to an embodiment of the invention. As shown in FIG. 5, the waveform of control signal CTL2* can be an inverted form of the waveform of control signal CTL2. The waveforms of signal OSC and control signals CTL1 and CTL2 can be similar to, or identical to, those shown in FIG. 2.

The functions of transistors 422 and 442 can be similar to or identical to those of transistors 322 and 342 of FIG. 3. For example, during the operation of charge pump 435, transistors 422 and 442 in FIG. 4 can be turned off to decouple nodes 362a and 362b from node 303 (e.g., during time interval 241 in FIG. 5) or turned on to couple nodes 362a and 362b to node 303 (e.g., during time interval 242 in FIG. 5).

In an alternative structure of charge pump 435, the combination of transistors 312 and 422 or the combination of transistors 332 and 442 can be omitted. In such an alternative structure, only one of capacitors C1 and capacitor C2 (either C1 or C2) can be coupled to node 303 during time interval 242. For example, if transistors 332 and 442 are omitted, only capacitor C1 can be coupled to node 303 (e.g., through transistor 422) during time interval 242. In another example, if transistors 312 and 422 are omitted, only capacitor C2 can be coupled to node 303 (e.g., through transistor 442). Omitting transistors from such an alternative structure of charge pump 435 may save space. However, in comparison with charge pump 435 shown in FIG. 4, the alternative charge pump may take more time for output voltage $V_{OUT}$ to reach its selected (e.g., predetermined) value, may have reduced drive capability, or both.

The illustrations of the apparatuses (e.g., device 100 including charge pump 135 and charge pumps 335 and 435) and methods (e.g., method of the operations performed by device 100, charge pump 335, and charge pump 435) are intended to provide a general understanding of the structure of various embodiments, and are not intended to provide a complete description of all the elements and features of an apparatus that might make use of the structures described herein.

The apparatuses (e.g., device 100 including charge pump 135 and charge pumps 335 and 435) described above may include hardware circuitry; single and/or multi-processor circuits; memory circuits; software program modules, objects, and/or firmware; and combinations thereof, as desired and/or as appropriate for particular implementations of various embodiments.

Device 100 may be included in apparatuses (e.g., electronic circuitry) such as high-speed computers, communication and signal processing circuitry, single or multi-processor modules, single or multiple embedded processors, multi-core processors, message information switches, and application-specific modules including multilayer, multi-chip modules. Such apparatuses may further be included as sub-components within a variety of other apparatuses (e.g., electronic systems), such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others.

The embodiments described above with reference to FIG. 1 through FIG. 5 include apparatuses and methods having an input node to receive a first voltage, an output node to provide an output voltage, and a charge pump to generate the output voltage based on the first voltage. The charge pump can include a control node to receive a control signal for controlling at least one switch of the charge pump such that the output voltage includes a value greater than a value of the first voltage. The control signal can include a level corresponding to a second voltage having a value greater than the value of the output voltage. Other embodiments, including additional apparatuses and methods, are described.

The above description and the drawings illustrate some embodiments to enable those skilled in the art to practice the embodiments of the invention. Other embodiments may incorporate structural, logical, electrical, process, and other changes. Examples merely typify possible variations. Portions and features of some embodiments may be included in, or substituted for, those of other embodiments. Many other embodiments will be apparent to those of skill in the art upon reading and understanding the above description.

What is claimed is:

1. An apparatus comprising:
an input node to receive a first voltage;
an output node to provide an output voltage; and
a charge pump to generate the output voltage based on the first voltage, the charge pump including a control node to receive a control signal generated by a generator that includes a node to receive a supply voltage not based on the output voltage for controlling switches of the charge pump such that the output voltage includes a value greater than a value of the first voltage, wherein the control signal includes a level corresponding to a second voltage having a value greater than the value of the output voltage, and a duty cycle of the control signal is changed if the value of the output voltage exceeds one of a lower limit and an upper limit in order to maintain the value of the output voltage within the lower limit and the upper limit, wherein the charge pump includes capacitors coupled in series between an additional node and ground, wherein only one of the capacitors is coupled to the output node through one of the switches.

2. The apparatus of claim 1, wherein the additional node is to be coupled to the output node during generation of the output voltage, and the capacitors are arranged to provide a voltage to the additional node during the generation of the output voltage by the charge pump, such that a maximum value of the voltage at the additional node is a non-integer multiple of the value of the first voltage during the generation of the output voltage.

3. The apparatus of claim 1, wherein the additional node is to be decoupled from the output node during a first time interval of the generation of the output voltage and to be coupled to the output node during a second time interval of the generation of the output voltage.

4. An apparatus comprising:
an input node to receive a first voltage;
an output node to provide an output voltage;
a first capacitor;
a second capacitor; and
switches configured to couple the first capacitor in series with the second capacitor between the input node and a reference node during a first portion of a period of a control signal generated by a generator that includes a node to receive a supply voltage not based on the output voltage, and to decouple the first capacitor from the second capacitor during a second portion of the period of the control signal, wherein only one of the first and second capacitors is coupled to the output node through one of the switches, and the switches are configured to couple the first capacitor to the output node during the second portion of the period of the control signal, such that a value of the output voltage is greater than a value of the first voltage, wherein a duty cycle of the control signal is changed if the value of the output voltage exceeds one of a lower limit and an upper limit in order to maintain the value of the output voltage within the lower limit and the upper limit, and the switches include a transistor having a gate to receive the control signal, the control signal having a level based on a second voltage, the second voltage having a value greater than the value of the output voltage.

5. The apparatus of claim 4, wherein the switches include:
a first transistor to couple the first capacitor to the second capacitor during the first portion of the period of the control signal and to decouple the first capacitor from the second capacitor during the first portion of the period of the control signal;
a second transistor to couple the first capacitor to the input node during the first portion of the period of the control signal; and
a third transistor to couple the second capacitor to the reference node during the first portion of the period of the control signal, wherein the transistor having the gate to receive the control signal is one of the first, second, and third transistors.

6. The apparatus of claim 5, wherein the switches further include:

a fourth transistor to couple a first side of the first capacitor to the output node during the second portion of the period of the control signal; and a fifth transistor to couple a second side of the first capacitor to the input node during the second portion of the period of the control signal.

7. The apparatus of claim 6, wherein the fifth transistor includes an n-channel transistor and the fourth transistor includes a p-channel transistor.

8. The apparatus of claim 6, wherein each of the first, second, and fourth transistors includes an n-channel transistor.

9. An apparatus comprising:

a first node to receive a first supply voltage having a first value;

a second node to receive a second supply voltage having a second value greater than the first value;

a first generator including a node to receive the second supply voltage and to generate control signals having a level corresponding a voltage based on the second supply voltage; and a second generator to receive the control signals and generate an output voltage, such that the output voltage includes a value between the first and second values, and the second voltage is not generated based on the output voltage, wherein the first generator is to perform one of deactivating the control signals, activating the control signals, and changing a duty cycle of the control signals if the value of the output voltage exceeds one of a lower limit and an upper limit in order to maintain the value of the output voltage within the lower limit and the upper limit, wherein the second generator includes:

an output node to provide the output voltage;

a first group of transistors to couple first and second capacitors between the first node and a reference node during a first time interval of generation of the output voltage;

a second group of transistors to couple the first capacitor between the first node and the output node during a second time interval of the generation of the output voltage; and a third group of transistors to couple the second capacitor between the first node and the output node during the second time interval of the generation of the output voltage, wherein the second group of transistors include an n-channel transistor and a p-channel transistor.

10. The apparatus of claim 9, wherein the third group of transistors include an n-channel transistor and a p-channel transistor.

11. An apparatus comprising:

an input node to receive an input voltage;

an output node to provide an output voltage;

a first capacitor coupled to a node, a first transistor coupled to the first capacitor, a second capacitor coupled to the first transistor, and a second transistor coupled to the second capacitor, wherein the first capacitor, the first transistor, the second capacitor, and the second transistor are couple in series between the node and a reference node, and only one of the first and second capacitors is coupled to the output node through a third transistor;

a fourth transistor coupled between the input node and the node; and a fifth transistor coupled between the input node and one of the first and second capacitors, wherein a value of the output voltage is greater than a value of the input voltage, at least one of the first, second, third, fourth, and fifth transistors having a gate to receive a control signal, the control signal having a level based on a second voltage, the second voltage having a value greater than the value of the output voltage.

12. The apparatus of claim 11, wherein the third and fifth transistors include different types of transistors.

13. The apparatus of claim 11, wherein the third transistor includes a p-channel transistor and the fifth transistor includes an n-channel transistor.

* * * * *